United States Patent [19]

Schulze

[11] Patent Number: 4,871,130
[45] Date of Patent: Oct. 3, 1989

[54] PROPULSION APPARATUS FOR AN AIRCRAFT

[76] Inventor: Walter Schulze, In der Oeverscheidt 127, D-4600 Dortmund 76, Fed. Rep. of Germany

[21] Appl. No.: 209,633
[22] Filed: Jun. 21, 1988
[51] Int. Cl.[4] .............................................. B64D 27/02
[52] U.S. Cl. ........................................ 244/55; 244/65
[58] Field of Search ...................... 244/55, 65, 66, 13, 244/60, 87; D12/339

[56] References Cited

U.S. PATENT DOCUMENTS

| D. 150,181 | 7/1948 | Wibault | D12/339 |
|---|---|---|---|
| 1,987,606 | 1/1935 | Davis | 244/66 |
| 2,452,281 | 10/1948 | Zimmerman | 244/60 |
| 2,532,755 | 12/1980 | Bloomfield | 244/65 |

Primary Examiner—Galen L. Barefoot
Attorney, Agent, or Firm—Toren, McGeady & Associates

[57] ABSTRACT

An internal combustion engine is installed near to the center of gravity of an aircraft and has a power output shaft which is arranged to be inclined with respect to the aircraft longitudinal axis, in the direction of a high empennage of the aircraft. An extension shaft follows coaxially from the engine power output shaft, which extension shaft is connected to a propeller shaft by a single reorientation transmission or gear box. The gear box is designed as a miter gear box. A pusher propeller is arranged at the rear end of the empennage. Instead of a miter gear box, a constant speed universal joint can also be utilized.

6 Claims, 1 Drawing Sheet

PROPULSION APPARATUS FOR AN AIRCRAFT

FIELD AND BACKGROUND OF THE INVENTION

The present invention relates in general to propulsion apparatus for aircraft and, in particular, to a new and useful combination, including a rotary engine having a power output shaft, the rotary engine being positioned near the center of gravity of the aircraft, with the output shaft extending at an angle to the longitudinal axis of the aircraft, and a pusher propeller mounted for rotation near the rear of the aircraft and connected to the output shaft for rotation of the propeller.

In a known propulsion or power drive train, as described in the publication "Aero", May 1971, pages 108-110, the longitudinal axis of an engine power output shaft is arranged essentially parallel to the aircraft longitudinal axis. The engine power take-off shaft is coupled with an extension shaft which extends up to the tail of the fuselage and also in the direction of the aircraft longitudinal axis. The tail end of the horizontal shaft is connected to a vertical shaft by means of a miter gear, which vertical shaft extends up to the upper region of the empennage. The upper end of the vertical shaft is connected to a propeller shaft extending essentially parallel to the aircraft longitudinal axis, the connection also being by means of a miter gear. Viewed in the flight direction, the propeller is arranged in front of the empennage.

Such a propulsion arrangement makes it possible for the aircraft to take off and land at a large angle of attack without running the danger of the propeller touching the ground, even with the comparatively short landing gear. The short take-off and landing properties connected therewith permit even relatively inexperienced pilots to use airfields with short runaways. This propulsion arrangement has, however, the disadvantage of long complication drive trains between engine and propeller. Such a drive train is not only burdened with considerable weight problems, but also difficulties arise, particularly with the vibration-free integration of bearings for the shafts, as well as the redirection gear boxes. The drive train is also prone to the malfunction, because of the multiplicity of parts. An additional disadvantage is the fact that transmissions which change the direction of propulsive power through about 90°, have relatively high maintenance costs. In this connection, one has to additionally consider the heat generation in the region of the miter gear boxes which requires additional cooling arrangements. The diameter of the propeller is also limited by the clearance which is needed to the upper surface of the fuselage.

A construction type of this species is disclosed in German patent No. 7 22 883. A considerable disadvantage of this type of construction is due to the fact that the propeller shaft extends coaxially with the inclined extension shaft, and is arranged at a relatively large angle of inclination with respect to the aircraft longitudinal axis. Such a propeller arrangement may indeed have advantages during the take-off phase for an aircraft. During flight, however, especially during cruising flight, which is performed essentially in a horizontal attitude, the incident flow conditions in front of the pusher propeller are very inexact and aerodynamically, extraordinarily unfavorable.

The fact that the engine is located very far behind the center of gravity of the aircraft is also a disadvantage.

Such a layout for an engine in an aircraft, is, in certain circumstances, sensible in the known types of construction with an inclined propeller shaft. It requires, however, the arrangement of balancing weights in the nose section of the aircraft which, while compensating for the tail heaviness of the aircraft, considerably increases its overally weight.

Another disadvantage of the known type of construction consists in circumstances that, because of the comparatively low location of the propeller shaft, a portion of the pusher propeller lies in the interference field of the empennage, as well as in the wake flow of the fuselage.

A relocation of the propeller shaft into an essentially undisturbed region above the longitudinal axis of the aircraft is hardly possible in the known designs, since such a measure would involve an even larger inclination of the propeller shaft, with all the disadvantages connected therewith. This means that the diameter of the pusher propeller is also relatively small. The propeller rpm must, therefore, be high. This lowers the propeller efficiency. The take-off power deteriorates, and fuel consumption is high with a comparatively large generation of noise.

SUMMARY OF THE INVENTION

The present invention is based upon the task of improving the prior propulsive arrangement in such a way that, while the expense of the transmissions or gear boxes, required for transmitting the propulsion power from the internal combustion engine to the pusher propeller is held at a comparatively low level, the aerodynamic properties are considerably improved at a high propeller efficiency, higher power output and a considerable savings in fuel consumption.

Accordingly, an object of the present invention is to provide, in combination with an aircraft having a center of gravity (CG), a longitudinal axis and a high empennage, a propulsion arrangement comprising a rotary engine mounted to the aircraft near the center of gravity thereof, the rotary engine having a power output shaft with an axis inclined upwardly and rearwardly toward the empennage with respect to the longitudinal axis of the aircraft, an extension shaft coaxially connected to the power output shaft, a propeller shaft mounted to the aircraft and extending substantially parallel to and spaced above the longitudinal axis of the aircraft, a pusher propeller connected to the propeller shaft for rotation with rotation of the propeller shaft, and a single redirection mechanism coupled between the extension shaft and the propeller shaft for rotating the propeller shaft with rotation of the extension shaft.

In spite of the fact that the engine is now located near the CG in the fuselage, meaning in the region of the airfoil profile, the engine output can still be transmitted to the pusher propeller nearly in a straight line if the propeller shaft is arranged so as to be nearly parallel to the aircraft longitudinal axis and spaced higher than the aircraft longitudinal axis. The inclined installation of the extension shaft, at a relatively small angle with respect to the propeller shaft, allows the empennage to be designed in an optimum aerodynamic manner. Because of the high arrangement of the propeller shaft, a preponderant portion of the pusher propeller is effective in the aerodynamic airflow, which is affected only by the empennage. Negative fuselage wake flow is eliminated. Because of the high location of the propeller shaft, the diameter of the pusher propeller can be very large without having to fear ground contact of the pusher propeller at large angles of incidence, and the therewith connected short take-off and landing properties. Because of the lower propeller rpm in this arrangement, the propeller efficiency is improved and, with this, take-off performance, as well as cruising performance, is also improved. The noise generation is also lowered because of the now lower propeller rpms by approximately 10 dBA.

The design of the extension shaft can vary. It can be a continuous single piece, or be made up of several parts. Particularly, low weight construction materials can be utilized which contribute to lowering the overall aircraft weight.

A preferred embodiment of the redirection drive train between the extension shaft and the propeller shaft is a miter gear box. Such a drive can be constructed to be very small, not only overall, but also as far as the bearings are concerned. Despite this, a large amount of power can be transmitted.

Revolving forces do not have to be sustained. Standard ball or roller bearings of small dimensions can even be utilized.

Another advantage of such a drive train consists in that, hydraulic propeller adjustment can take place through the extension shaft, the miter gear box and the propeller shaft. Furthermore, it is conceivable that the lubrication of the drive train can be accomplished by engine oil.

The redirection transmission can be designed as a constant velocity universal joint. Preferably, a twin Cardan universal joint shaft can be used. With an overall angular deflection of the longitudinal axis of the extension shaft, with respect to the propeller shaft of about 24°, the two portions of a twin Cardan universal joint shaft need only be deflected by about 12° each.

The possibility of increasing the propeller diameter, together with all the advantages connected therewith, is further refined by placing the propeller shaft near the upper edge region of the empennage.

It naturally lies within the scope of the present invention if appropriate coupling elements are integrated into suitable regions of the drive train between the engine and the pusher propeller for damaging vibrations and irregularities of torque.

A further object of the present invention is to provide a propulsion arrangement for an aircraft which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the following, the invention is described in particularity, with the help of embodiments depicted in the drawings. In the drawings.

DESCRIPTION OF THE PREFERRED EMBODIMENTS

Figures 1, 2:
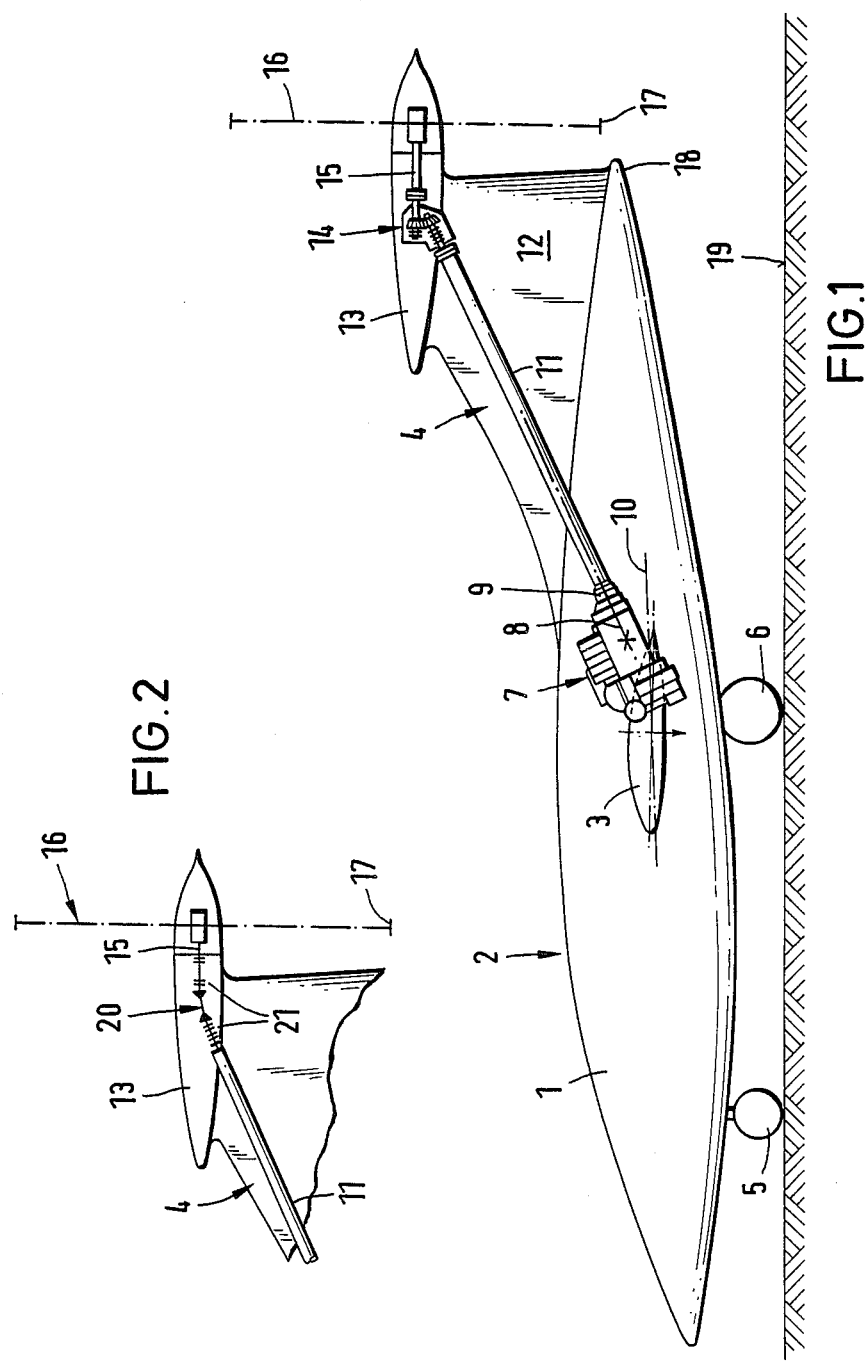
FIG. 1 is a schematic view of a touring or general aviation aircraft, in vertical longitudinal section.
FIG. 2 is a fragmentary, vertical, longitudinal, sectional view of another embodiment of the invention.

Referring to the drawings in particular, the invention embodied therein, in FIG. 1, comprises an aircraft, generally designated 2, having a propulsion arrangement therein for rotating a pusher propeller 16 mounted at the rear of an empennage, connected to the rear section of a fuselage 1 for the aircraft.

The fuselage 1 is, for instance, that of a four place touring or general aviation aircraft 2. Fuselage 1 carries wings or air foils 3 and the empennage generally designated 4.

A nose wheel 5, as well as main landing gear 6, are preferably retractable into fuselage 1.

The propulsion arrangement of aircraft 2 includes an internal combustion or other form of rotary engine 7 which is installed in the aircraft fuselage 1, near to the center of gravity thereof. Engine 7 has a longitudinal axis 8 for its engine output shaft 9, which is arranged so as to slope upwardly with respect to the aircraft longitudinal axis 10, toward the high empennage 4. The inclination can, for instance, be 24°.

The engine power output shaft 9 is coaxially coupled with an extension shaft 11 which transmits torque in a completely satisfactory manner. The extension shaft 11 extends through the vertical fin 12 of the empennage 4, up to the root of the horizontal stabilizer surface 13 located at the upper end of the empennage 4. The upper end of the extension shaft 11 is connected by means of a bevel drive or miter gear box 14 with the propeller shaft 15 arranged essentially parallel to the aircraft longitudinal axis 10 and also in the root of the horizontal stabilizer surface 13. A propeller 16 is fastened to the propeller shaft 15 at the rear end of the empennage 4. This, thus, is a pusher propeller 16. In spite of the large diameter of the pusher propeller 16, the propeller tips 17 do not project beyond the fuselage or tail cone end 18 in the direction of the ground 19.

In the embodiment of FIG. 2, a constant velocity joint 20 is utilized instead of the mitered gear box 14 in FIG. 1. In this case, coupling elements 21 for dampening vibrations and torque irregularities are installed upstream and downstream of the joint 20. Such coupling elements 21 can, if necessary, also be incorporated at other points of the drive train 9, 11, 14 and 15, for instance, within the framework of the embodiment of FIG. 1. Joint 20 is a twin Cardan universal joint, for example.

While specific embodiments of the invention have been showed and described in detail to illustrate the application of the principles of the invention, it will be understood that the invention may be embodied otherwise without departing from such principles.

The invention claimed is:

1. In combination with an aircraft having a fuselage, a high empennage connected to the rear of the fuselage, a center of gravity and a longitudinal axis, a propulsion arrangement comprising an internal combustion engine mounted to the fuselage near the center of gravity of the aircraft, said rotary engine having a power output shaft with an axis which is inclined upwardly and rearwardly toward the empennage with respect to the longitudinal axis of the aircraft, an extension shaft coaxially connected to said power output shaft and extending to the empennage, a propeller shaft mounted for rotation near the rear of the aircraft, said propeller shaft being parallel to and spaced above the longitudinal axis of the aircraft and located in a portion of said empennage, a pusher propeller connected to the rear of said propeller shaft and a single redirection transmission coupled between said extension shaft and said propeller shaft for transmitting rotation of said power output shaft to said propeller shaft, said propeller shaft being spaced above the longitudinal axis of the aircraft to an extent so that said pusher propeller is not affected by negative wake flow of the fuselage.

2. The combination of claim 1, wherein said redirection mechanism comprises a miter gear box connected between said propeller shaft and said extension shaft.

3. The combination of claim 1, wherein said redirection mechanism comprises a twin Cardan constant velocity universal joint connected between said propeller shaft and said extension shaft.

4. The combination of claim 1, wherein the empennage has an upper longitudinal end region, said propeller shaft being mounted for rotation in said upper longitudinal end region of the empennage.

5. The combination of claim 1, wherein said power output shaft and coaxial extension shaft extend at an angle of about 24° with respect to the longitudinal axis of the aircraft.

6. The combination of claim 1, wherein the empennage includes a vertical stabilizer fin conected near the rear end of the fuselage and a horizontal stabilizer surface connected to the top of the fin, said propeller shaft being mounted for rotation in the empennage near the horizontal stabilizer surface, said pusher propeller being mounted for rotation behind the fin.

* * * * *